C. CORNWALL & D. J. FOLTZ.
SPRAYING MACHINE.
APPLICATION FILED MAY 18, 1914.

1,128,856.

Patented Feb. 16, 1915.

UNITED STATES PATENT OFFICE.

CHARLES CORNWALL AND DAVID J. FOLTZ, OF SALEM, OHIO, ASSIGNORS TO THE DEMING COMPANY, OF SALEM, OHIO, A CORPORATION OF OHIO.

SPRAYING-MACHINE.

1,128,856.

Specification of Letters Patent. Patented Feb. 16, 1915.

Application filed May 18, 1914. Serial No. 839,229.

*To all whom it may concern:*

Be it known that we, CHARLES CORNWALL and DAVID J. FOLTZ, citizens of the United States, residing at Salem, in the county of Columbiana and State of Ohio, have invented a certain new and useful Improvement in Spraying-Machines, of which the following is a full, clear, and exact description, reference being had to the accompanying drawings.

This invention relates to spraying devices of the portable tractor type and particularly to that class of such devices adapted to be moved along a row or between rows of plants, the traction of a wheel providing the necessary power for spraying.

An object of our invention is to provide a tractor spraying machine, of such nature, which shall be very efficient in operation and strong and durable in construction.

Another object is to so construct the machine that it shall be simple and may be comparatively cheaply manufactured.

More specific objects are to provide for conveniently converting the device into a hand operated spraying device, and still another object is to provide a simple means for holding the spraying nozzles, which may be readily adjusted to allow for various sizes of plants and width of rows.

Other objects will become apparent in the following description and the essential characteristics are set forth in the claims.

Figure 1:
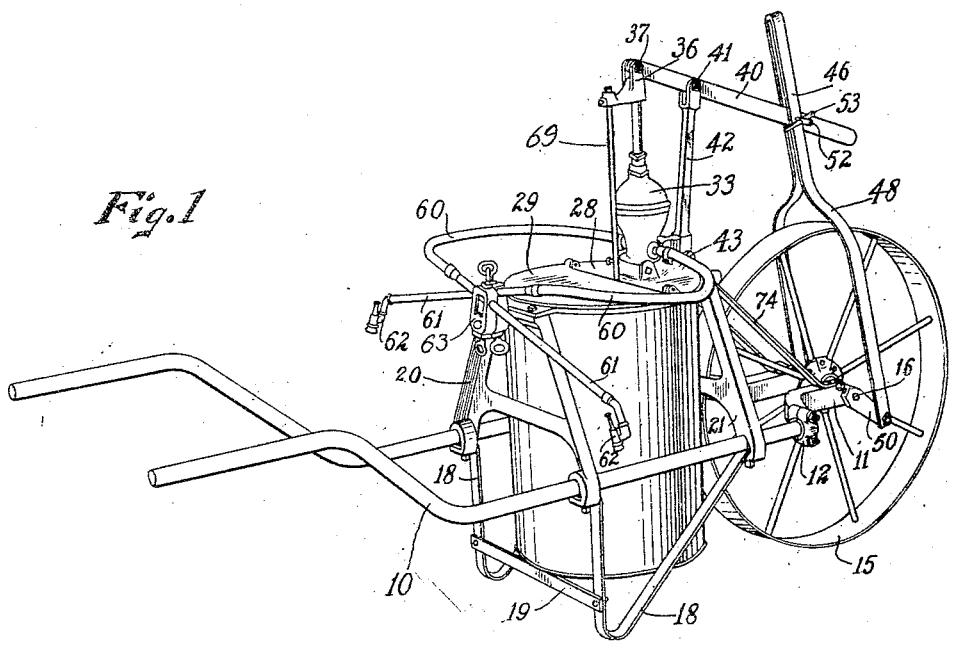
Figure 2:
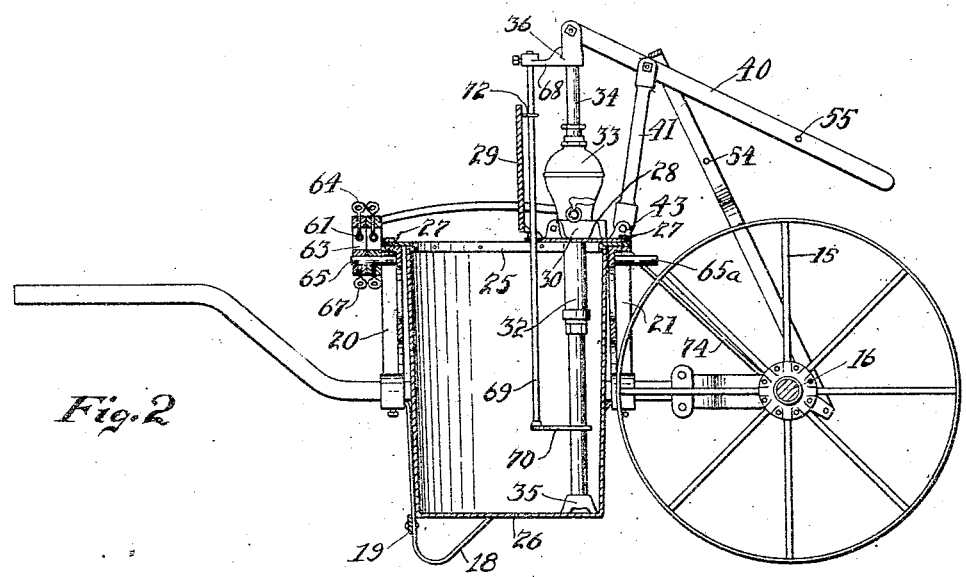

In the drawings: Figure 1 is a perspective view of our machine. Fig. 2 is a longitudinal vertical section of the same.

The frame of our machine comprises two tubular handle bars 10 each adapted to be secured at their forward ends to trunnion brackets 11, which have clamps 12 embracing the ends of the handle bars and are held in place by suitable bolts. The brackets extend inwardly and then forwardly and are supported by means of a suitable axle 16 having its ends journaled therein and carried by the wheel 15. Toward the rear the handle bars diverge and are bent upwardly and then rearwardly, forming suitable handles by which the machine may be moved.

When stationary, the machine is carried on supports 18, comprising U-shaped members adapted to rest on the ground. The rear leg of each support extends vertically to the under side of the handle bar and is bent rearwardly, forming a lip adapted to be clamped to the handle bar. The front leg extends upwardly at somewhat of an incline, to the under side of the handle bar and has a forwardly bent lip also adapted to be clamped to the handle bar. Connecting the rear legs of the supports 18 at some point near the ground, is provided a strip 19, which acts as a lateral brace on these legs.

Mounted on the forward portion of the handle bars, are two substantially A-shaped frames 20 and 21, preferably formed of integral castings, the upwardly extending legs and upper cross member of which are of angle or L section. At the lower ends of the legs are formed hollow bosses surrounding the handle bars and having flattened lower portions embracing the lips on the upper ends of the legs of the supports 18. Suitable set screws in the under side of these bosses engage these lips and clamp the brackets to the handle bars as well as securing the supports in position. The cross members connecting the upper portion of the legs of each of the brackets 20 and 21, have a flat upper surface forming a support for a flanged ring 25, rigidly secured in the upper end of a substantially cylindrical tank 26. This ring is provided with laterally extending ears 27 lying over the top of the cross members of the brackets 20 and 21 and secured thereto by means of suitable bolts, the holes of which are so spaced that either of the ears may lie on the cross member of either bracket.

On the top of the ring 25 is secured a circular cover formed of two pieces 28 and 29 hinged together, the piece 29 being preferably loose so that it may be raised, providing access to the container. The forward member 28 which is secured to the ring 25 by means of suitable bolts, is provided with a boss 30 which is bored to receive a cylinder 32 of a suitable pump.

Above the boss 30 the pump is provided with a usual pressure chamber 33 from which the plunger 34 extends upwardly as shown. At the lower end the pump chamber is provided with a suitable strainer 35, adapted to rest on the bottom of the tank 26.

The plunger of the pump is provided at its upper end with a suitable pivot member 36, formed of a body casting and having upwardly extending ears 37, the ears 37 embracing the end of a pump lever or handle 40, which is pivoted thereto by means of a suitable bolt. The fulcrum for the pump handle comprises a strut 42 having a bifurcated upper end pivoted to the handle lever by means of a bolt 41 and a bifurcated lower end embracing integral ears 43 in the cover plate 28 to which it is pivoted by means of a removable pin or bolt.

The forward end of the handle lever is embraced between two parallel strips 46 of a yoke-shaped pitman 48. At their upper ends these strips are integrally connected as shown, and are pivoted at their lower ends to the outer ends of crank arms 50 rigidly mounted on the ends of the axle of the wheel 15. The handle lever may be pivotally connected to the yoke pitman by means of a removable pin 52, secured in place by a tapered plug 53 extending through a hole in this pin. This pin extends through holes 54 in the strips 46 of the yoke pitman and through a hole 55 in the handle lever. Thus it will be seen that when it is desired to use the pump as a tractor, the parts just described may be connected as shown in Fig. 1, then by moving the device along the ground, the rotation of the wheel 15 through the cranks 50 and pitman 48 will oscillate the handle lever 40 and operate the pump within the tank. In order to operate the pump by hand, the pin 52 may be removed, the yoke pitman allowed to rest against the upper end of the strut 41 as shown in Fig. 2, in which position it does not interfere with the free movement of the handle lever, or the yoke may be entirely removed.

Extending from the lower portion of the chamber 33 of the pump, may be provided short lengths of hose 60, connected to the ends of short pipes 61 having at their other ends suitable spraying nozzles 62. These pipes 61 may be mounted in clamp blocks 63 through which they are slidable, these clamp blocks having set screws 64 adapted to engage the pipes to hold them in any desired position. The clamping blocks thus are mounted on a projecting finger or stud 65, preferably integral with the frame bracket 20. The clamp blocks may be moved about this stud and clamped at any desired angle by means of set screws 67. Thus the nozzles may be placed in any desired position by sliding the pipes through the clamps and changing their angles to provide for various sizes of plants and different widths of rows. If desired, the clamps may be mounted on a similar finger 65ᵃ on the forward frame bracket 21.

The pivot block 36 has a laterally projecting arm 68 secured to the upper end of a rod 69 having at its lower end a suitable agitator 70 adapted to keep the mixture within the tank 26 stirred when the pump is in operation. The hinged cover plate 29 may be provided with a suitable hook 72 which may be turned to engage the rod 69 to hold the cover plate, when desired. Braces 74 may be provided extending from the trunnion brackets 11 to the frame bracket 21, to add rigidity to the frame.

From the foregoing description it will be seen that we have provided a tractor spraying device which may be very conveniently operated, which is simple in construction and which has no parts liable to get out of order. It will also be noted that if desired, the flanged ring may be disconnected from the frame brackets 20 and 21 by removing the bolts holding the same, and may be secured with the ears 27 reversed, bringing the pump and handle lever toward the rear where it may be more readily reached by an operator without leaving his position at the handles.

In using our machine, it is convenient to draw out the pin 52 and re-insert it with the pitman free between the strut 41 and the pin. In this condition the device is wheeled to the place of use, then the pitman is connected, the pipes 61 are adjusted, if necessary, to give the proper spread and direction to the spray, and the rolling forward of the device between the rows properly sprays them. When the handle is disconnected any occasional spraying may be conveniently done by the operator standing in front of the machine and pumping by hand. If hand spraying is desired for any considerable time the bolts 27 may be disconnected and the tank and pump turned around diametrically to bring the pump handle into convenient position for the operator; or the pump handle may be disconnected at 37 and 41 and turned in the opposite direction and the pins inserted with the end of the lever pivoted to the strut and the intermediate portion connected with the pump rod.

It will be noted that the forward ends of the handle-bars are embraced by the clamps 12, and which may be loosened by loosening the bolts. Thus the rear ends of the handle-bars may be turned inwardly or outwardly by loosening these clamps and the set screws which support the frame, the handle-bars extending loosely through the frame members supporting the tank. This allows an adjustment of the distance between the handles to bring them in the most desirable position for each individual operator.

Having thus described our invention, what we claim is:

1. In a portable spraying machine, the combination of a frame, a tank carried by the frame, a wheel at the forward end thereof, a pump within the tank, a yoke pitman having spaced parallel portions above the wheel and extending outwardly and downwardly over each side of the wheel, cranks on the axle of the wheel connected to the legs of the pitman, a lever connected with the pump and extending between said parallel portions of the pitman and loosely engaged and adapted to be guided thereby when manually operated, and a fulcrum for the lever, said lever being detachably connected to the pitman at the parallel portions.

2. In a portable spraying machine, the combination of a pair of handle bars, a wheel mounted near one end thereof, a pair of brackets secured to said handle bars and extending upwardly therefrom, a ring resting on the tops of said brackets, a tank secured to said ring and depending from it, a top for the tank resting on said ring, and a pump carried by said top and extending into the tank.

3. In a portable spraying machine, the combination of a frame comprising a pair of handle bars, a wheel to which they are connected at the forward ends, a pair of A-frame brackets having the feet of the brackets secured to the handle bars, a flanged ring mounted between the upper ends of said brackets, a tank entirely carried by said flanged ring, a pump in the tank, lengths of hose extending from the pump, pipes connected to the hose and having spraying nozzles at their outer ends, clamps pivotally secured to one of said frame brackets adapted to embrace the pipes and hold them at any desired angle, while allowing a longitudinal shifting of the pipes.

4. In a portable spraying device, the combination with a frame comprising a pair of handle bars connected by a pair of A-frame brackets, a tank supported by and intermediate of the brackets, a pump in the tank, lengths of hose extending from the pump, pipes connected to the ends of the hose and having spraying nozzles at their outer ends, a stub shaft rigid with and extending laterally from one of the brackets, clamps pivotally mounted on said stub shaft and embracing said pipes, and set screws in said clamps for securing the clamps and pipes in any desired position.

5. In a portable spraying machine, the combination of a frame, a tank carried by the frame, a wheel at the forward end thereof, a pump within the tank, a yoke pitman having spaced parallel portions above the wheel extending downwardly over each side of the wheel, cranks on the axle of the wheel connected to the legs of the pitman, a lever connected with the pump and extending between said parallel portions, and means for detachably connecting the lever with the pitman, said parallel portions extending upwardly a considerable distance above the connection of the lever.

In testimony whereof, we hereunto affix our signatures in the presence of two witnesses.

CHARLES CORNWALL
DAVID J. FOLTZ.

Witnesses:
W. J. TERRY,
N. J. READY.